Figure 1:
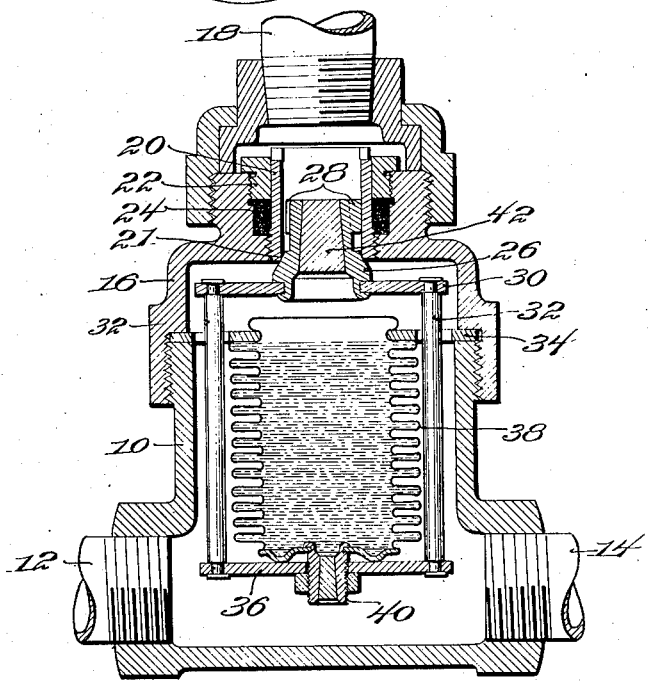

Feb. 17, 1931.  W. B. CLIFFORD  1,792,891
TEMPERATURE CONTROLLED VALVE
Filed Sept. 23, 1927

Inventor
Walter B. Clifford

Patented Feb. 17, 1931

1,792,891

UNITED STATES PATENT OFFICE

WALTER B. CLIFFORD, OF CAMBRIDGE, MASSACHUSETTS

TEMPERATURE-CONTROLLED VALVE

Application filed September 23, 1927. Serial No. 221,572.

The present invention relates to temperature-controlled valves, and more particularly to valves of this character designed for operation at predetermined temperatures independently of pressures.

It is common practice in the construction of temperature-controlled valve mechanism to provide a bellows thermostat filled with a suitable saturated vapor for creating sufficient pressure within the bellows to open or close a valve at a predetermined temperature point. This type of construction functions with sufficient accuracy for all practical purposes where the external pressure upon the bellows or the pressure operating to resist or aid in the opening or closing of the valve does not vary substantially. Where substantial variations in pressure occur, however, an operating irregularity is introduced into the construction which may conceivably cause considerable variation in the temperature of operation and render the control ineffective.

The object of the present invention is to improve and reorganize constructions of this character in such a manner that the temperature of operation of the valve is independent of external pressure conditions either surrounding the valve or the bellows, or both.

For the accomplishment of this and other objects, I propose to fill a bellows thermostat with a liquid which is non-vaporizable throughout the temperature range to which the bellows is subjected, and in operation to cause the bellows to be expanded to afford a cubical capacity greater than the cubical content of contained liquid, thus creating a void or vacuum within the bellows which must be overcome by expansion of the liquid before expansion of the bellows, due to rise in temperature, occurs. It will be evident that with this type of construction, initial rise in temperature causes no movement of the bellows and connected valve until the expansion of the contained liquid fills the void, when thereafter further rise in temperatures causes expansion of the bellows in accordance with further expansion of the liquid. The maintenance of the bellows in expanded position with a vaccum or void therein may be secured in any desired manner, as for example by engagement of the valve with its seat in such a manner as to prevent contraction of the bellows under the action of the vacuum internally.

I have disclosed my invention as embodied in a relief valve for hot water systems which is desired to open and vent water upon rise of temperature within the system to a predetermined point, as for example 180° F. When the temperature is raised to this point, expansion of the bellows unseats the valve and vents hot water, irrespective of pressure conditions about the bellows or variation of pressure tending to retard the opening of the valve. Upon venting a sufficient amount of hot water to substantially lower the temperature within the system, the bellows again contract and the valve is closed. It will be evident that not only is this construction independent of pressure variations, but in addition as the opening of the valve is caused by liquid expansion a positive opening force is created which operates quite independently of any external pressure conditions.

Figure 2:
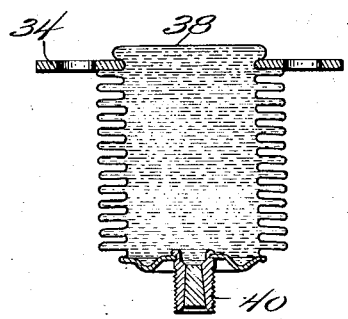

Referring to the accompanying drawings, Fig. 1 represents a section in elevation of my improved type of bellows thermostat embodied in a hot water relief value; and Fig. 2 is a section of a bellows completely filled with liquid.

Referring to the illustrated embodiment of the invention, a suitable form of casing is indicated at 10 with inlet and outlet connections 12 and 14. Surmounting the casing is a head 16 provided with a vent connection 18 which is opened intermittently by the action of the automatic valve. Positioned within the head 16 below the vent is a sleeve 20 providing a valve seat 21 at its lower edge. This seat is threaded within the interior of the head, and may be adjusted vertically to vary the opening temperature of the valve in a manner to be hereinafter described. The sleeve is sealed in any adjusted position by a gland 22 which engages and compresses the packing 24. Cooperating with the lower edge of the sleeve is a conical valve 26 provided with fluted guides 28. This valve is mounted on a base 30, which in turn is carried by a series of rods 32 sliding within a stationary plate 34. The lower ends of the rods are connected to a plate 36 to which is attached the lower free end of a bellows thermostat 38 through the stud 40. The upper end of the bellows is formed into the plate 34 to prevent movement and to cause expansion of the bellows to move the plate 36 and connected parts, including the conical valve 26, downwardly to unseat the valve from the lower end of the sleeve. The plate 34 is rigidly clamped between the portions 10 and 16 of the valve casing, and maintains the entire assemble in aligned position. With this construction, by adjusting the sleeve 20 vertically, the temperature of opening or venting of the valve may be controlled within desired limits. The interior of the bellows, as indicated in Fig. 2, is filled with a liquid which is non-vaporizable throughout the temperature of operation of the bellows, such as a paraffine base oil from which the lighter constituents have been completely removed. In ordinary practice the bellows are completely filled with liquid care being taken to expel all air from within the bellows, preferably by a vacuum, and thereafter the filled bellows is hermetically sealed. Having thus filled and sealed the bellows with liquid, it is mounted in the valve assembly in such a manner that the bellows is expanded somewhat beyond its normal filled position into approximately the position shown in Fig. 1. In this position the bellows is prevented from contracting or collapsing, due to engagement of the valve with the lower end of the sleeve. Thereafter, upon raising the temperature of the bellows assembly, the initial result is to overcome the void created within the bellows by expansion thereof, and thereafter upon complete filling of the bellows, due to expansion of the liquid, further rise in temperature expands the bellows and unseats the valve. By varying the expansion of the bellows beyond the normal filled position, a lag of variable amount may be introduced into the operation of the valve and the temperature controlled as desired. Furthermore, with such a construction, not only is the operation of the valve entirely independent of pressure conditions, but in addition the movement is positive and predetermined by rise in temperature. As an addtional safeguard in systems of this character, the valve 26 is made hollow and is filled with a plug of fusible metal 42, which is intended to melt and vent water from within the valve casing if the valve for any reason whatsoever fails to open. It will be obvious that the fusible plug will be designed to melt at a somewhat higher temperature than the normal operation of the valve.

This type of valve is particularly adapted for relieving the pressure within hot water boilers under abnormal or unusual conditions, and is particularly effective on that type of system connected directly with outside pressure where the system is ordinarily subjected to a variable pressure, due to variations in city pressure or to difference in location.

It will be understood, furthermore, that although the bellows thermostat, filled as described, is peculiarly adapted for this type of valve, nevertheless it is equally well adapted to the operation of other devices where automatic operation under predetermined temperature conditions is desired without introduction of error due to variable pressures.

What is claimed is:

1. Temperature controlled apparatus comprising a hermetically sealed metallic bellows filled with a substantially non-vaporizable liquid, means for anchoring the bellows at one end, a valve connected with the free end of the bellows, and associated means for maintaining the bellows at atmospheric temperatures expanded beyond its normal filled condition such that the cubical contents of the bellows are greater than the cubical contents of the contained liquid creating a void therein, and introducing a lag into the operation of the bellows until the cubical contents of the liquid have expanded to completely fill the space within the bellows.

2. Temperature controlled apparatus comprising a hermetically sealed metallic bellows filled with a substantially non-vaporizable liquid, means for anchoring the bellows at one end, a valve connected with the free end of the bellows, a valve seat cooperating with the valve and normally serving to maintain the bellows at atmospheric temperatures such that the cubical contents of the bellows are greater than the cubical contents of the contained liquid creating a void therein, and introducing a lag into the operation of the bellows until the cubical contents of the liquid have expanded to completely fill the space within the bellows.

3. Temperature controlled apparatus comprising a housing, means for conducting fluid medium to the housing, a port for venting fluid medium from the housing, a metallic bellows supported within the housing and containing expansible fluid to cause expansion and contraction of the bellows at varying temperatures, means for anchoring the bellows at one end within the housing, a valve connected with the free end of the bellows and operating in conjunction with the vent to control the flow of fluid medium through the vent, and a fusible member inserted within the valve and designed upon fusing to permit escape of fluid medium through the vent independently of the position of the valve.

WALTER B. CLIFFORD.